(12) United States Patent
Kim et al.

(10) Patent No.: US 9,903,025 B2
(45) Date of Patent: Feb. 27, 2018

(54) APPARATUS FOR PREPARING HYDROGEN WATER

(71) Applicants: PAINO INC., Seoul (KR); Seong Tae Kim, Seoul (KR)

(72) Inventors: Seong Tae Kim, Seoul (KR); Kuen Gui Lee, Gyeonggi-do (KR)

(73) Assignee: Paino Inc., Seoul (KR)

( * ) Notice: Subject to any disclaimer, the term of this patent is extended or adjusted under 35 U.S.C. 154(b) by 253 days.

(21) Appl. No.: 14/442,286

(22) PCT Filed: Nov. 12, 2013

(86) PCT No.: PCT/KR2013/010237
§ 371 (c)(1),
(2) Date: May 12, 2015

(87) PCT Pub. No.: WO2014/073938
PCT Pub. Date: May 15, 2014

(65) Prior Publication Data
US 2016/0076155 A1    Mar. 17, 2016

(30) Foreign Application Priority Data

Nov. 12, 2012   (KR) .......................... 10-2012-0127421

(51) Int. Cl.
C25B 1/04    (2006.01)
C25B 1/10    (2006.01)
(Continued)

(52) U.S. Cl.
CPC ................ C25B 1/10 (2013.01); C02F 1/461 (2013.01); C02F 1/46104 (2013.01); C25B 1/04 (2013.01);
(Continued)

(58) Field of Classification Search
CPC .... C25B 1/04; C25B 1/10; C25B 1/13; C25B 9/08; C25B 13/04; C25B 15/08;
(Continued)

(56) References Cited

U.S. PATENT DOCUMENTS 5,688,387 A    11/1997  Fongen
2006/0193758 A1   8/2006  Nam et al.

FOREIGN PATENT DOCUMENTS

CN    205856615 U  *  1/2017  ............... C25B 1/10
EP    0 970 262 B1    3/2006

* cited by examiner

Primary Examiner — Ciel P Thomas
(74) Attorney, Agent, or Firm — Boyle Fredrickson, S.C.

(57) ABSTRACT

An apparatus for preparing hydrogen water includes: an electrolysis device configured to electrolyze water and including an electrode module formed of a positive electrode, a negative electrode, a solid polymer electrolyte membrane, and an auxiliary electrode, wherein the electrolysis device is divided into a first chamber and a second chamber with the electrode module as a center; a hydrogen water discharge port configured to discharge hydrogen water including active hydrogen generated at the negative electrode of the first chamber, by being arranged in the first chamber; a spray port configured to spray water toward the negative electrode, by being arranged in the first chamber; an ozone water discharge port configured to discharge water including ozone generated at the positive electrode of the second chamber; a storage tank configured to store hydrogen water and sterilizing water in an internal space thereof, by being connected to a first flow channel connected to the hydrogen water discharge port and to a second flow channel connected to the first flow channel and receiving the hydrogen water generated in the first chamber, and by receiving the sterilizing water generated in the second chamber through a fourth flow channel connected to the ozone water (Continued)

discharge port; and a pump including an output end connected to the a flow channel connected to the spray port and an input end connected to a fifth flow channel connected to a bottom surface of the storage tank, wherein the spray port sprays the hydrogen water stored in the storage tank, using a pressure of the pump, faster than a flow velocity of the hydrogen water discharged through the hydrogen water discharge port.

2 Claims, 7 Drawing Sheets

(51) Int. Cl.
    *C25B 1/13*     (2006.01)
    *C25B 9/08*     (2006.01)
    *C25B 13/04*     (2006.01)
    *C25B 15/08*     (2006.01)
    *C02F 1/461*     (2006.01)
    *C02F 1/467*     (2006.01)

(52) U.S. Cl.
    CPC ............... *C25B 1/13* (2013.01); *C25B 9/08* (2013.01); *C25B 13/04* (2013.01); *C25B 15/08* (2013.01); *C02F 1/4672* (2013.01); *C02F 1/4676* (2013.01); *C02F 2201/4611* (2013.01); *C02F 2201/4618* (2013.01); *C02F 2201/46115* (2013.01); *C02F 2201/46195* (2013.01); *Y02E 60/366* (2013.01)

(58) Field of Classification Search
    CPC .... C02F 1/461; C02F 1/46104; C02F 1/4672; C02F 1/4676; C02F 2201/4611; C02F 2201/46115; C02F 2201/46195; C02F 2201/4618; Y02E 60/366
    See application file for complete search history.

APPARATUS FOR PREPARING HYDROGEN WATER

BACKGROUND/FIELD OF THE DISCLOSURE

The present disclosure relates to an apparatus for preparing hydrogen water to generate water in which content of active hydrogen is increased, by electrolyzing original water.

DISCUSSION OF THE RELATED ART

As public attention to health is increasing, usage of water purifier to generate drinking water or buying purified water is rapidly growing, rather than directly drinking tap water.

So far in general, the water purifier has been recognized as a device to purify drinking water by removing foreign matters included in original water. However, attentions to the water purifier which able to generate functional water such as ion water or alkaline water more than merely filtering the foreign matters are recently increasing, as well as various projects to manufacture such water purifier are under development.

In particular, it has been asserted that the active hydrogen combines with the active oxygen in a body so as to reduce incidence of disease caused by the active oxygen when the active hydrogen in a state of atom (other than hydrogen in a state of molecule) is included in drinking water. Hence, researches in various shapes of devices for including active hydrogen in water are currently under way.

SUMMARY OF THE DISCLOSURE

One purpose of the present disclosure is to provide an apparatus for preparing hydrogen water of which flow channel structure is enhanced, so as to increase concentration of active hydrogen included in water.

In a general aspect of the present disclosure, there is provided an apparatus for preparing hydrogen water, the apparatus comprising: an electrolysis device configured to electrolyze water and including an electrode module formed of a positive electrode, a negative electrode, a solid polymer electrolyte membrane, and an auxiliary electrode, wherein the electrolysis device is divided into a first chamber and a second chamber with the electrode module as a center; a hydrogen water discharge port configured to discharge hydrogen water including active hydrogen generated at the negative electrode of the first chamber, by being arranged in the first chamber; a spray port configured to spray water to the negative electrode, by being arranged in the first chamber; an ozone water discharge port configured to discharge water including ozone generated at the positive electrode of the second chamber; a storage tank configured to store hydrogen water and sterilizing water in an internal space thereof, by being connected to a first flow channel connected to the hydrogen water discharge port and to a second flow channel connected to the first flow channel and receiving the hydrogen water generated in the first chamber, and by receiving the sterilizing water generated in the second chamber through a fourth flow channel connected to the ozone water discharge port; and a pump including an output end connected to the a flow channel connected to the spray port and an input end connected to a fifth flow channel connected to a bottom surface of the storage tank, wherein the spray port sprays the hydrogen water stored in the storage tank, using a pressure of the pump, faster than a flow velocity of the hydrogen water discharged through the hydrogen water discharge port.

In some exemplary embodiments of the present disclosure, centers of the spray port, the negative electrode, and the ozone water discharge port may be arranged to be coaxial with one another.

In some exemplary embodiments of the present disclosure, the spray port may spray the hydrogen water stored in the storage tank to the negative electrode in a direction perpendicular to a moving direction of the hydrogen water discharged through the hydrogen water discharge port.

In some exemplary embodiments of the present disclosure, the fourth flow channel may be connected to the storage tank by being divided into an ozone removal flow channel (D1) and a sterilizing flow channel (D2).

In another general aspect of the present disclosure, there is provided an apparatus for preparing hydrogen water, the apparatus comprising: an electrolysis device configured to electrolyze water and including an electrode module formed of a positive electrode, a negative electrode, a solid polymer electrolyte membrane, and an auxiliary electrode, wherein the electrolysis device is divided into a first chamber and a second chamber with the electrode module as a center; an inlet port configured to supply original water to the first chamber of the electrolysis device, by being directly connected to a water source for supplying original water; a hydrogen water discharge port configured to discharge hydrogen water including active hydrogen generated at the negative electrode of the first chamber through a first and a second flow channels, by being arranged in the first chamber; a spray port configured to spray the hydrogen water discharged from the hydrogen water discharge port to the first chamber, by being connected to a third flow channel branched from the first flow channel; and an ozone water discharge port configured to discharge water including ozone generated at the positive electrode of the second chamber, by being connected to a fourth flow channel, wherein the second and the fourth flow channels supply hydrogen water including sterilizing water to a user, by being merged together.

In some exemplary embodiments of the present disclosure, centers of the inlet port and the hydrogen water discharge port may be arranged to be coaxial with each other, and centers of the spray port, the negative electrode, and the ozone water discharge port may be arranged to be coaxial with one another.

In some exemplary embodiments of the present disclosure, the spray port may spray the hydrogen water stored in the storage tank to the negative electrode in a direction perpendicular to a moving direction of the hydrogen water discharged through the hydrogen water discharge port.

The apparatus for preparing hydrogen water according to an exemplary embodiment of the present disclosure may increase concentration of hydrogen included in the hydrogen water having passed through the electrode whereby hydrogen atoms which were adhered to a surface of the negative electrode are separated, because the water is sprayed in a direction perpendicular to a negative electrode surface while an inlet and an outlet flow channels of original water are formed at the negative electrode of the electrode module.

DETAILED DESCRIPTION

Hereinafter, exemplary embodiments of the present disclosure will be described with reference to the enclosed drawings.

Figure 1:
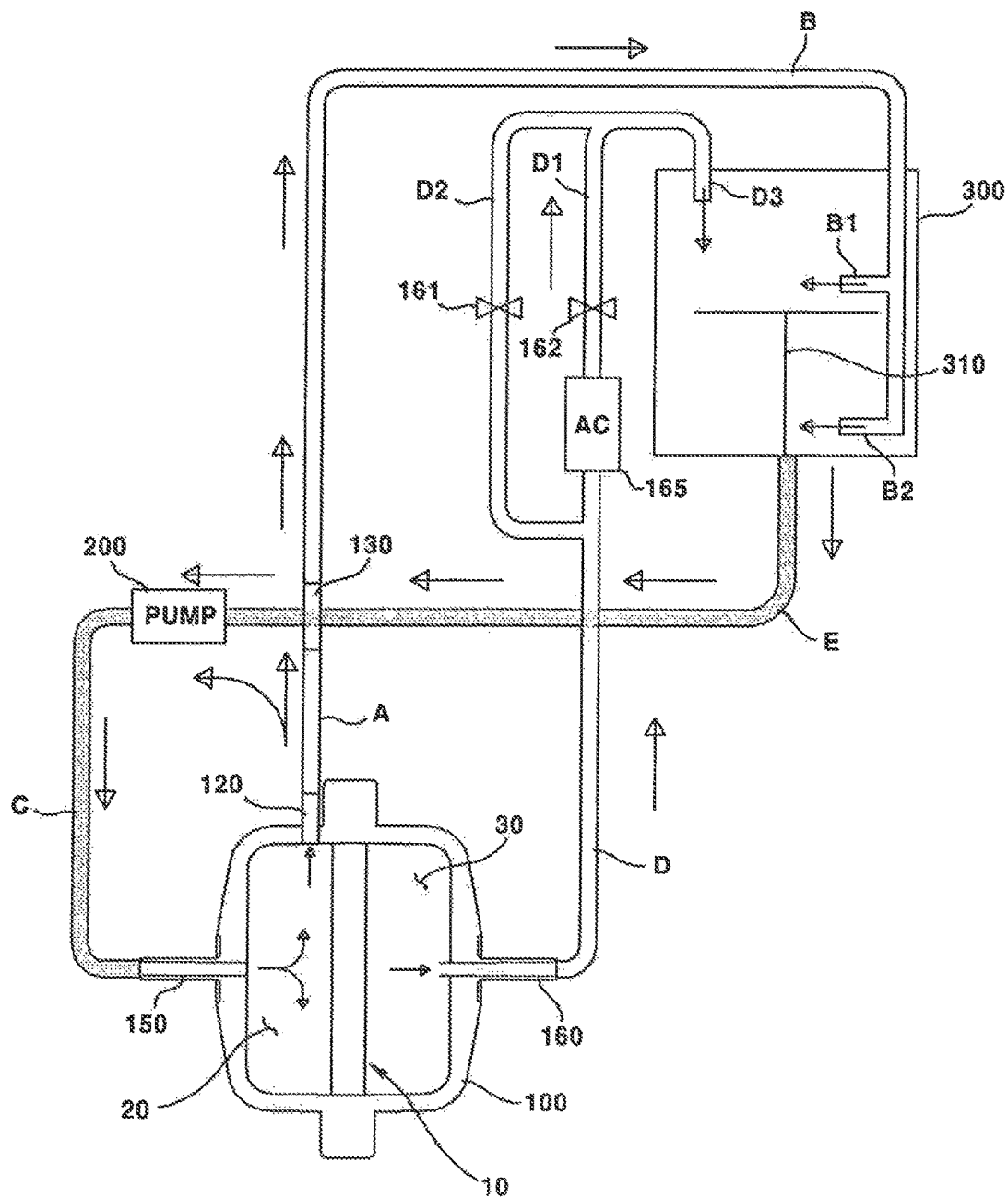
FIGS. 1 to 3 are schematic views illustrating a structure of an apparatus for preparing hydrogen water including a storage tank according to a first exemplary embodiment of the present disclosure.
Figure 2:
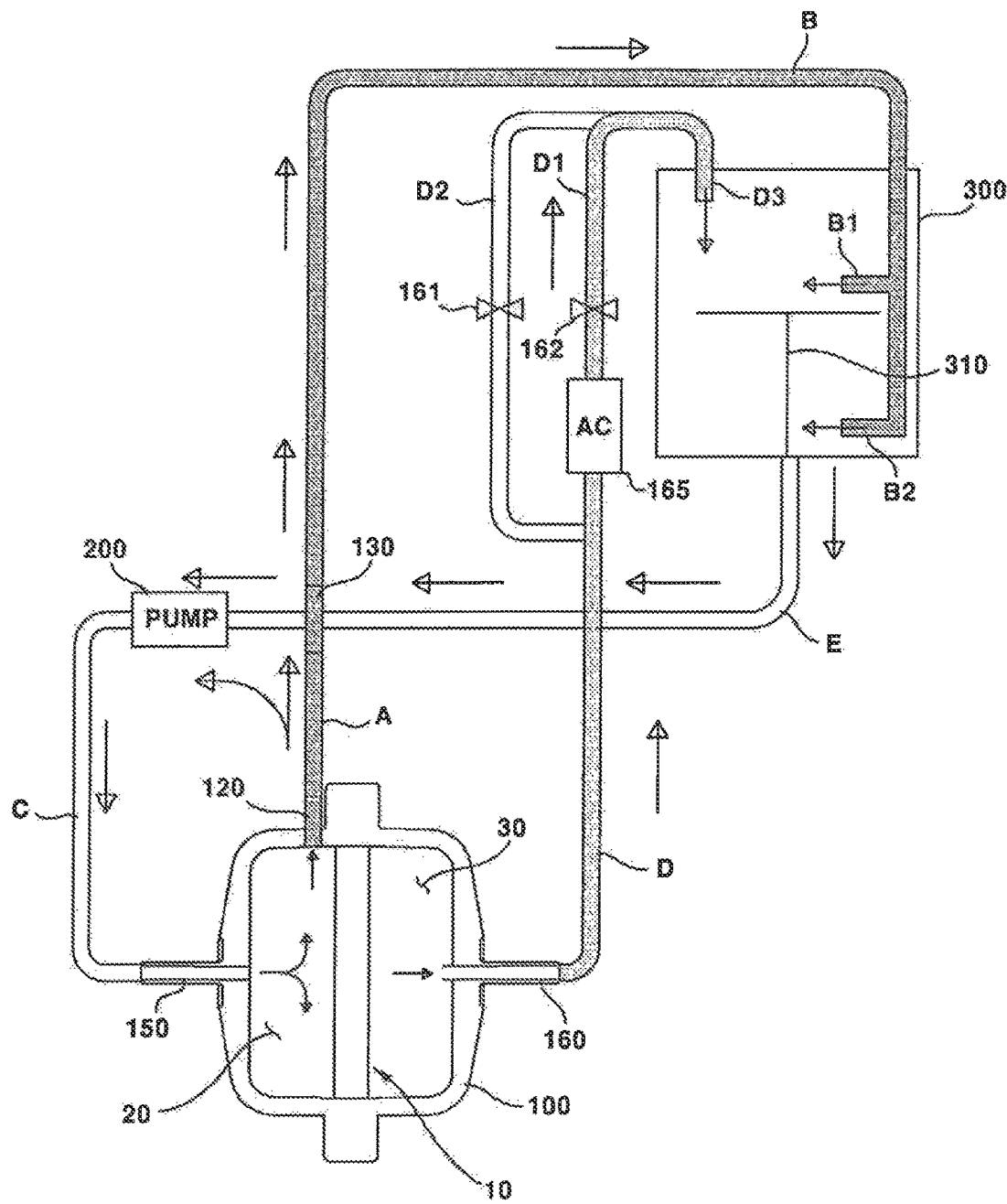
Figure 3:
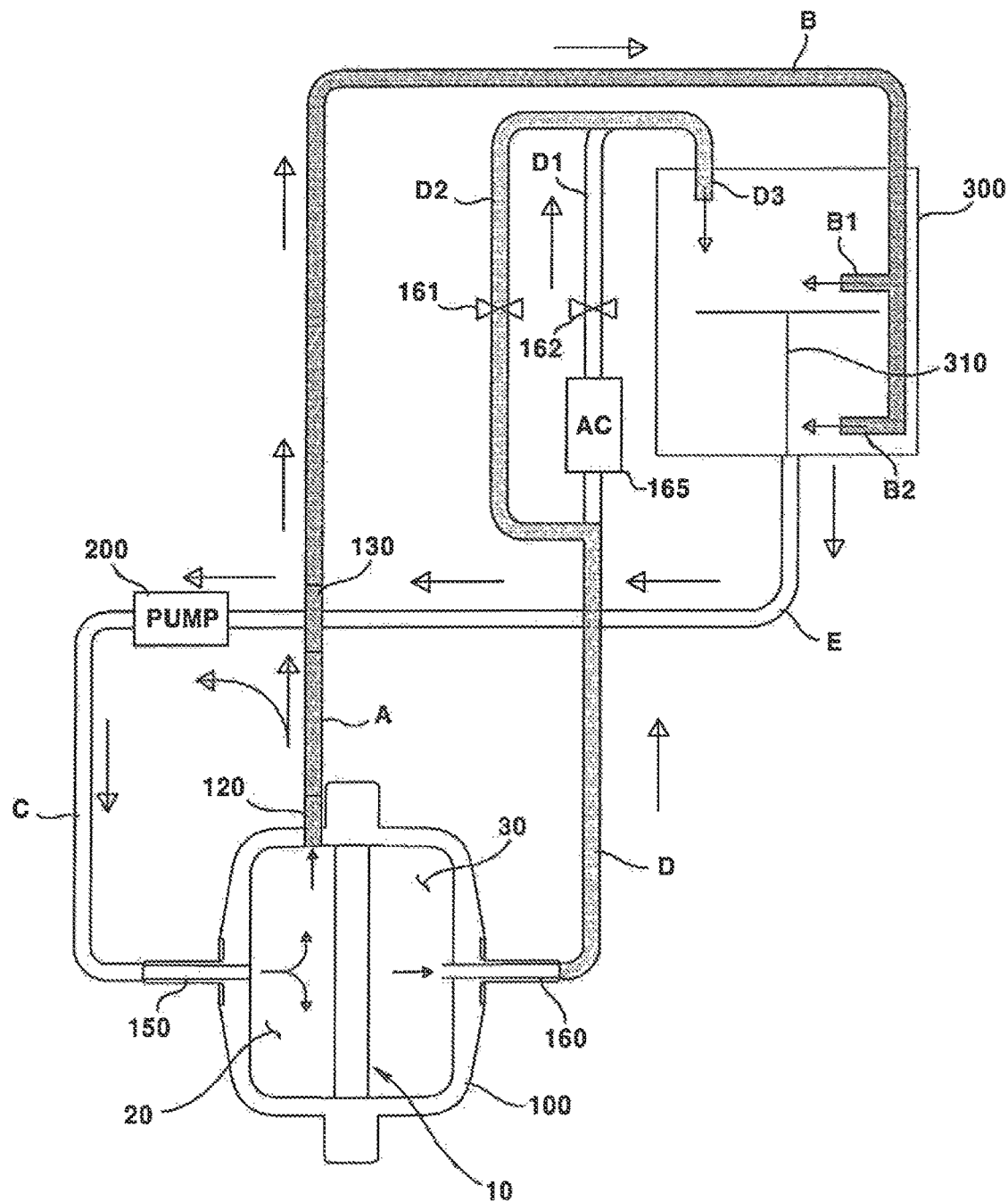
Figure 4:
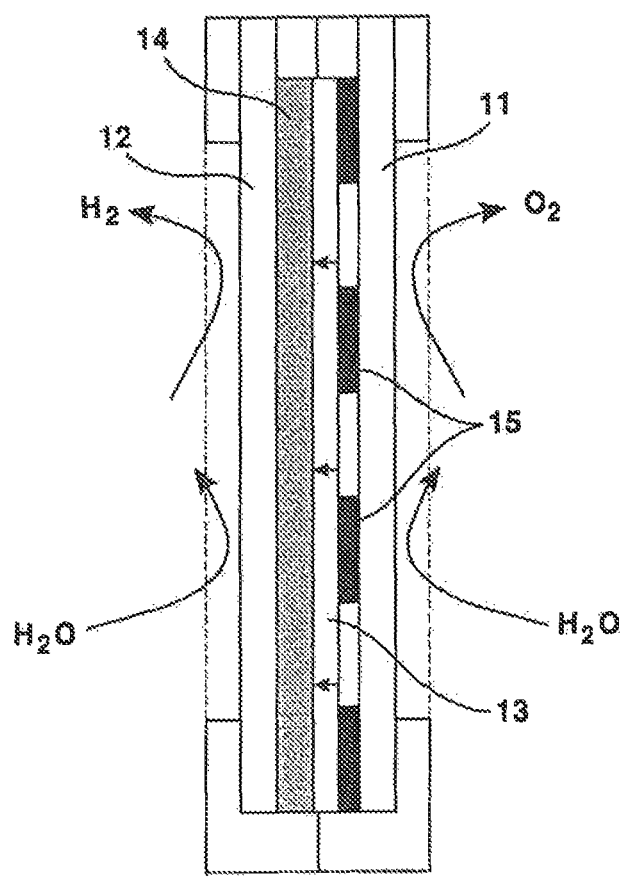
FIG. 4 is a schematic view illustrating an electrode module of FIG. 1.
Figure 5:
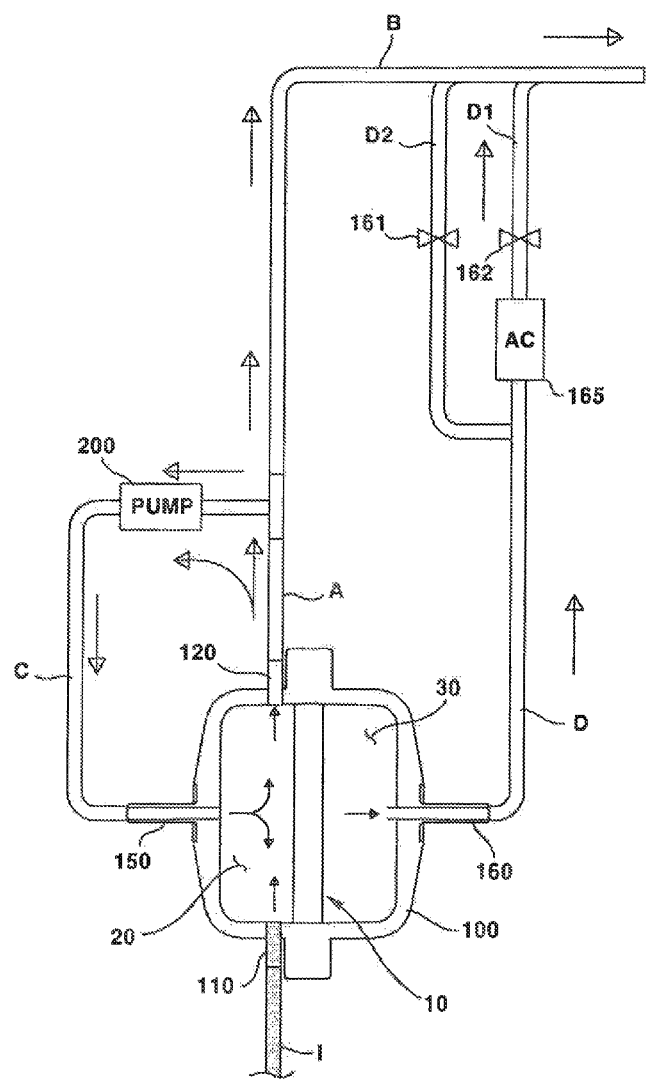
FIGS. 5 to 7 are schematic views illustrating a structure of an apparatus for preparing hydrogen water of a direct water method according to a second exemplary embodiment of the present disclosure.
Figure 6:
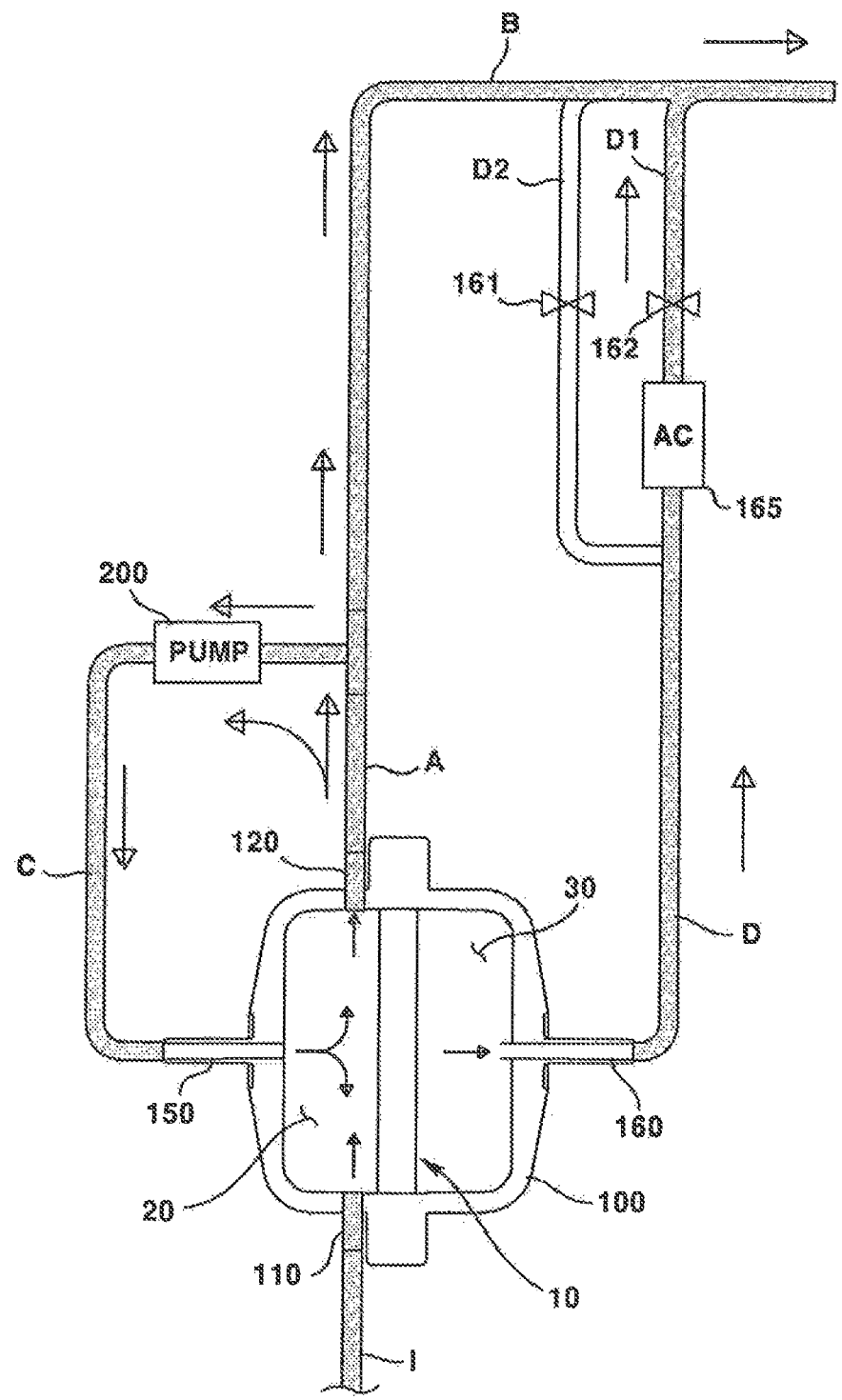
Figure 7:
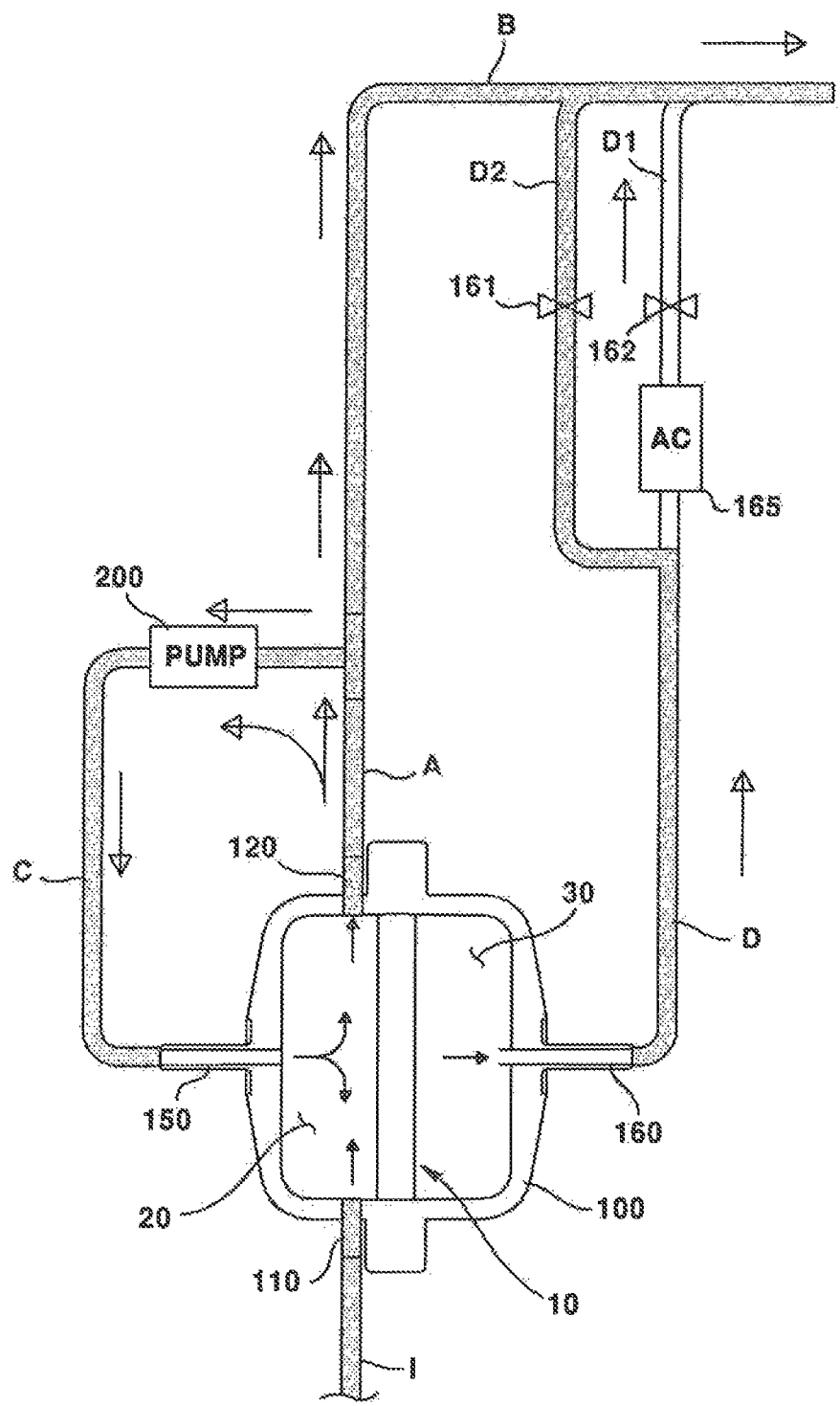

FIGS. 1 to 3 are schematic views illustrating a structure of an apparatus for preparing hydrogen water including a storage tank according to a first exemplary embodiment of the present disclosure; FIG. 4 is a schematic view illustrating an electrode module of FIG. 1; and FIGS. 5 to 7 are schematic views illustrating a structure of an apparatus for preparing hydrogen water of a direct water method according to a second exemplary embodiment of the present disclosure.

According to a first exemplary embodiment of the present disclosure, an electrolysis device (100) according to a first exemplary embodiment may include a hydrogen water discharge port (120), a spray port (150), and an ozone water discharge port (160). Since original water is supplied through a storage tank (300), the electrolysis device (100) may receive original water through the spray port (150) as illustrated in the drawings. A detailed structure of the electrolysis device (100) may be provided as the apparatus disclosed in Korean Patent No. 10-564654.

An electrode module (10) may be provided in the electrolysis device (100). The electrolysis device (100) may be divided into a first chamber (20) and a second chamber (30) with the electrode module (10) as a center.

As illustrated in FIG. 4, the electrode module (10) may include: a positive electrode (11) configured to initiate an electrolysis response in water; a negative electrode (12) configured to initiate an electrolysis response in water by being disposed to be opposite to the positive electrode (11); a solid polymer electrolyte membrane (13) configured to deliver hydrogen ions generated by the electrolysis response between the positive electrode (11) and the negative electrode (12); and an auxiliary electrode (14) configured to reduce generation of scale on a surface of the negative electrode (12), by being disposed between the negative electrode (12) and the solid polymer electrolyte membrane (13), and by passing hydrogen ions generated at the positive electrode (11) to the negative electrode (12) and generating scales generated whereby OH-ions generated at the negative electrode (12) react with divalent positive ions on a surface of the auxiliary electrode (14).

Here, the auxiliary electrode (14) may be fixed by being adjacent to the negative electrode (12); the solid polymer electrolyte membrane (13) may be fixed by being adjacent to the negative electrode (12); and the solid polymer electrolyte membrane (13) and the auxiliary electrode (14) may be coupled by being opposite to each other. The auxiliary electrode (14) and the spacer (15) may be disposed at both sides of the solid polymer electrolyte membrane (13) so as to obtain a stable operational characteristic by procuring a much equalized mechanical push characteristic between both of the electrodes and the solid polymer electrolyte membrane (13).

A first flow channel (A), through which hydrogen water is to be discharged, may be connected to the hydrogen water discharge port (120). The first flow channel (A) may supply hydrogen water generated in the first chamber (20) to the storage tank (300), by being connected to the second flow channel (B) through a connection member (130). The third flow channel (C) may receive hydrogen water stored in the storage tank (300) as original water. The hydrogen water inhaled to an input end of a pump (200) may be supplied into the first chamber (20) through the spray port (150), by being pressed using the pump (200) installed on the third flow channel (C).

Here, a flow velocity of the hydrogen water sprayed through the spray port (150) may be formed to be faster than a flow velocity of the hydrogen water discharged from the first chamber (20). In addition, the hydrogen water sprayed through the spray port (150) may be sprayed to the negative electrode (12) in a direction perpendicular to a moving direction of the first flow channel (A) and the hydrogen water discharge port (120). The characteristic of the present disclosure is such structure to spray water in a direction perpendicular to a surface of the negative electrode (12) through the spray port (150).

That is, the spray port (150) may spray the hydrogen water in a direction perpendicular to a center of the electrode module (10) so that the hydrogen atoms which were adhered to a surface of the negative electrode (12) may be separated more easily. The separated hydrogen atoms may increase concentration of the hydrogen by being included in the water moving in the first chamber (20).

According to an exemplary embodiment of the present disclosure, a center of the spray port (150) and a center of the negative electrode (12) of the electrode module (10) may be arranged to be opposite to each other, so that the hydrogen water sprayed through the spray port (150) can apply pressure to as broad area of the negative electrode (12) as possible.

The diameter of the spray port (150) may formed as to be smaller than the diameters of the inlet port (110) and the hydrogen water discharge port (120), so as to render the spraying pressure of the hydrogen water sprayed through the spray port (150) to be strong.

Meanwhile, an end of the second flow channel (B) may be branched into a first hydrogen water outlet (B1) and a second hydrogen water outlet (B2), so as to supply the hydrogen water generated in the storage tank (300). Here, the first hydrogen water outlet (B1) may be disposed at a position higher than the second hydrogen water outlet (B2), so as to supply the hydrogen water to upper and lower spaces of a dividing panel (310) which divides the storage tank (300) in a shape of "T".

According to such structure of the present disclosure, the first hydrogen water outlet (B1) may be combined with sterilizing water supplied through a fourth flow path (D) (to be described hereinafter), thus, the water including less hydrogen concentration may be stored at a side of the hydrogen water outlet (B1) on the upper position. On the other hand, the hydrogen water supplied to the lower space below the dividing panel (300) through the second hydrogen water outlet (B2) may not as possible be combined with the water supplied through a sterilizing water outlet of the fourth flow channel (D).

Meanwhile, the ozone water discharge port (160) may discharge the sterilizing water including ozone generated in the positive electrode (11) to the fourth flow channel (D), by being connected to the fourth flow channel (D). Here, as illustrated in the drawings, the fourth flow channel (D) may include a connection unit curved in a shape of "L", so that ozone gas generated in the second chamber (30) may not remain inside of the second chamber (30), and so that an internal side of the second chamber (30) may be always filled with water. The fourth flow channel (D) may be branched into an ozone removal flow channel (D1) installed with an ozone removal filter (165) and a sterilizing flow channel (D2).

As illustrated in FIG. 2, in a hydrogen water generation mode, the water where ozone has been removed through the ozone removal filter (165) may be supplied into the storage tank (300) through the sterilizing water outlet (D3), by closing the first valve (161) and opening the second valve (162). That is, although ozone is removed through the ozone removal filter (165) using manganese, carbon, etc., the water supplied through the ozone removal flow channel (D1) may be regarded as sterilizing water, because the water has been primarily become sterilizing water while including ozone through the electrolysis in the electrode module (10).

As illustrated in FIG. 3, when sterilization of internal gas or hydrogen water in the storage tank (300) is required, the internal gas or hydrogen water in the storage tank (300) may be sterilized by discharging the sterilizing water including ozone into the storage tank (300) through the sterilizing flow channel (D2), by opening the first valve (161) and closing the second valve (162).

As illustrated in FIG. 1, such sterilizing water generated at the positive electrode (11) may be supplied above a surface of water, by forming a sterilizing water outlet (D3) on the upper surface of the storage tank (300). In this case, both of air and water in the storage tank (300) may be sterilized while the ozone water is being supplied through the sterilizing flow channel (D2).

A fifth flow channel (E) may be connected to a bottom surface of the storage tank (300). According to a first exemplary embodiment of the present disclosure, as illustrated in FIG. 1, the hydrogen water may be sprayed to the negative electrode (12) through the spray port (150) connected to the third flow channel (C).

According to the first exemplary embodiment of the present disclosure, the required water including high-concentration of active hydrogen may be generated by repeatedly electrolyzing the hydrogen water stored in the storage tank (300), because the concentration of hydrogen atoms included in the hydrogen water may be increased.

In addition, although not illustrated in the drawings, the storage tank (300) may include a cock unit for supplying the stored hydrogen water and an original water supply unit for supplying purified water.

As illustrated in FIGS. 5 to 7, an electrolysis device (100) according to a second exemplary embodiment of the present application may be of a direct water type to directly supply the generated hydrogen water to a user, by being directly connected to the original water without the storage tank (300) of the first exemplary embodiment of the present disclosure.

Here, the electrolysis device (100) may include an inlet port (110), a hydrogen water discharge port (120) configured to discharge hydrogen water, a spray port (150), and an ozone water discharge port (160).

As illustrated in FIG. 5, the inlet port (110) may be arranged in a direction parallel to the electrode module (10) and may be formed at a side of the first chamber (20) where the negative electrode (12) is formed. In addition, the hydrogen water discharge port (120) also may be arranged at the side of the first chamber (20).

An inlet pipe (I) may be connected to the inlet port (110) where the original water is to inflow. Each center of the inlet port (110) and the hydrogen water discharge port (120) may be arranged to be coaxial with each other. Here, the inlet port (110) and the hydrogen water discharge port (120) may be disposed at a position as close to the negative electrode (12) as possible.

As described in the above, when the inlet port (110) and the hydrogen water discharge port (120) is arranged at the position close to the negative electrode (12), the water passing through the inlet port (110) and the hydrogen water discharge port (120) may form a flow channel closely adhering to a surface of the negative electrode (120) to enhance the electrolysis performance of water. Thereby, as many hydrogen atoms separated from the surface of the negative electrode (120) may be combined with the flowing water as possible.

In particular, on the contrary to the first exemplary embodiment of the present disclosure, each end of the second flow channel (B) and the fourth flow channel (D) may be connected to each other (as illustrated in FIGS. 5 to 7) so as to supply hydrogen water to a user. According to the second exemplary embodiment of the present disclosure, the structure of the storage tank (300) which was included in the first exemplary embodiment of the present disclosure is omitted. Therefore, the generated hydrogen water may be generated instantly when required and directly supplied to a user, without being stored.

Therefore, as illustrated in FIG. 5, the inlet port (110) may receive original water by being directly connected to the original water, and as illustrated in FIG. 6, the hydrogen water may be discharged through the hydrogen water discharge port (120). Here, the discharged hydrogen water may be supplied to the second flow channel (B) through the first flow channel (A), and at the same time, may be sprayed from the spray port (150) through the third flow channel (C) by being inhaled by the pump (200). The operation of the sprayed water is the same as that according to the first exemplary embodiment of the present disclosure. Thus, the repetitious description will be omitted.

Once the hydrogen water is generated in such process as described in the above, as illustrated in FIG. 6, the first valve (161) may be closed and the second valve (162) may be opened in a hydrogen water supply mode. Thereby, the hydrogen water supplied through the second flow channel (B) may be supplied to a user together with the water in which ozone was removed through the ozone removal flow filter (165). That is, although ozone is removed through the ozone removal filter (165) using manganese, carbon, etc., the water supplied through the second flow channel (B) may be sterilizing water, because the water has been primarily become sterilizing water while including ozone through the electrolysis in the electrode module (10).

As illustrated in FIG. 7, when sterilization of flow channels such as a hydrogen water supply port is required, the supply flow channel such as a cock through which the hydrogen water is to be supplied may be cleansed by discharging the sterilizing water including ozone through the sterilizing flow channel (D2), by opening the first valve (161) and closing the second valve (162).

The embodiments described in the above and illustrated in drawings shall not be construed as limiting the technical spirit of the present disclosure. The protective scope of the present disclosure is to be limited only by the limitations disclosed in the claims, and a person skilled in the art of the present disclosure would be able to modify or transform the spirit of the present disclosure in various ways. Therefore, such modification or transformation shall be construed as being included within the protective scope of the present disclosure, as long as these modification or transformation would be obvious to those who skilled in the art.

The present disclosure is applicable to an apparatus for manufacturing functional water including hydrogen for the purpose of beauty and health care.

What is claimed:

1. An apparatus for preparing hydrogen water, the apparatus comprising:
an electrolysis device configured to electrolyze water and including an electrode module formed of a positive electrode, a negative electrode, a solid polymer electrolyte membrane, and an auxiliary electrode, wherein the electrolysis device is divided into a first chamber and a second chamber with the electrode module as a center;
a hydrogen water discharge port configured to discharge hydrogen water including active hydrogen generated at the negative electrode of the first chamber, by being arranged in the first chamber;
a spray port configured to spray water to the negative electrode, by being arranged in the first chamber;
an ozone water discharge port configured to discharge water including ozone generated at the positive electrode of the second chamber;
a storage tank configured to store hydrogen water and ozone water in an internal space thereof, by being connected to a first flow channel connected to the hydrogen water discharge port and to a second flow channel connected to the first flow channel and receiving the hydrogen water generated in the first chamber, and by receiving the ozone water generated in the second chamber through a fourth flow channel connected to the ozone water discharge port; and
a pump including an output end connected to a third flow channel connected to the spray port and an input end connected to a fifth flow channel connected to a bottom surface of the storage tank,
wherein a center of the spray port, a center of the negative electrode, and a center of the ozone water discharge port are arranged to be coaxial with one another,
wherein the fourth flow channel is connected to the storage tank by being divided into an ozone removal flow channel and a sterilizing flow channel, and wherein the ozone removal flow channel is installed with an ozone removal filter and a second valve, and the sterilizing flow channel is installed with a first valve.

2. The apparatus of claim 1, wherein
the spray port sprays the hydrogen water stored in the storage tank to the negative electrode in a direction perpendicular to a moving direction of the hydrogen water discharged through the hydrogen water discharge port.

* * * * *